(12) United States Patent
Link et al.

(10) Patent No.: US 10,982,669 B2
(45) Date of Patent: Apr. 20, 2021

(54) HYDRAULIC MOTOR DISC VALVE OPTIMIZATION

(71) Applicant: Parker-Hannifin Corporation, Cleveland, OH (US)

(72) Inventors: Todd Allen Link, Gray, TN (US); Samuel Lewis Morelock, Greeneville, TN (US); Kenneth Todd Gilbert, Bristol, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 348 days.

(21) Appl. No.: 16/096,405

(22) PCT Filed: Apr. 27, 2017

(86) PCT No.: PCT/US2017/029851
§ 371 (c)(1),
(2) Date: Oct. 25, 2018

(87) PCT Pub. No.: WO2017/209867
PCT Pub. Date: Dec. 7, 2017

(65) Prior Publication Data
US 2019/0136856 A1    May 9, 2019

Related U.S. Application Data

(60) Provisional application No. 62/343,983, filed on Jun. 1, 2016.

(51) Int. Cl.
*F03C 2/00*    (2006.01)
*F03C 4/00*    (2006.01)
(Continued)

(52) U.S. Cl.
CPC ............. *F04C 2/105* (2013.01); *F03C 2/08* (2013.01); *F04C 2/104* (2013.01); *F04C 14/14* (2013.01);
(Continued)

(58) Field of Classification Search
CPC .......... F04C 2/104; F04C 2/105; F04C 14/14; F04C 15/0046; F04C 15/06; F03C 2/08; F16K 11/074; F16K 11/076
See application file for complete search history.

(56) References Cited

U.S. PATENT DOCUMENTS

| 3,799,201 A | 3/1974 | Hansen et al. |
| 3,862,814 A * | 1/1975 | Swedberg ............... F04C 2/104 418/61.3 |

(Continued)

OTHER PUBLICATIONS

International Search Report and Written Opinion of PCT/US2017/029851 dated Jul. 3, 2017.

*Primary Examiner* — Theresa Trieu
(74) *Attorney, Agent, or Firm* — Renner, Otto, Boisseile & Sklar, LLP

(57) ABSTRACT

A disc valve assembly includes a disc element housed within a housing, the disc element having an inlet facing side and a second side opposite to the inlet facing side, and flow pathways configured as a plurality of different pressure zones with the flow pathways extending axially along a longitudinal axis of the disc element from at or adjacent to the inlet facing side to the second side. The valve housing that houses the disc element includes porting configured as part of the plurality of different pressure zones respectively in fluid communication with the flow pathways of the disc element. The disc element is configured to rotate to control a flow of hydraulic fluid through the disc valve assembly. The different pressure zones are isolated from each other (Continued)

using a plurality of annular sealing rings located on the inlet facing side of the disc element.

15 Claims, 3 Drawing Sheets

(51) Int. Cl.
  *F04C 2/00* (2006.01)
  *F04C 2/10* (2006.01)
  *F16K 11/074* (2006.01)
  *F16K 11/076* (2006.01)
  *F03C 2/08* (2006.01)
  *F04C 14/14* (2006.01)
  *F04C 15/00* (2006.01)

(52) U.S. Cl.
  CPC ........ *F04C 15/0046* (2013.01); *F16K 11/074* (2013.01); *F16K 11/076* (2013.01)

(56) References Cited

U.S. PATENT DOCUMENTS

| | | | | |
|---|---|---|---|---|
| 4,298,318 | A * | 11/1981 | Tsuchiya | F04C 2/104 418/61.3 |
| 4,343,600 | A * | 8/1982 | Thorson | F04C 2/104 418/61.3 |
| 4,533,302 | A * | 8/1985 | Begley | F04C 2/104 418/61.3 |
| 4,877,383 | A | 10/1989 | White, Jr. | |
| 5,137,438 | A * | 8/1992 | Miller | F04C 2/104 418/61.3 |
| 5,165,880 | A | 11/1992 | White | |
| 5,328,343 | A * | 7/1994 | Bernstrom | F04C 2/104 418/61.3 |
| 6,074,188 | A * | 6/2000 | White | F04C 2/104 418/61.3 |
| 6,793,472 | B2 * | 9/2004 | Dong | F04C 2/104 418/61.3 |
| 2007/0292296 | A1 | 12/2007 | Hicks | |
| 2014/0147321 | A1 | 5/2014 | Lucas et al. | |

* cited by examiner

HYDRAULIC MOTOR DISC VALVE OPTIMIZATION

RELATED APPLICATIONS

This application is a national stage application pursuant to 35 U.S.C. § 371 of PCT/US2017/029851 filed on Apr. 27, 2017, which claims the benefit of U.S. Provisional Application No. 62/343,983 filed Jun. 1, 2016, the contents of which are incorporated herein by reference.

FIELD OF INVENTION

The present invention relates generally to valve systems for hydraulic motors, and more particularly to disc valve assemblies for the control of hydraulic fluid flow through a hydraulic motor system.

BACKGROUND

Hydraulic fluid systems are utilized to generate power in a variety of industries. Mining and drilling equipment, construction equipment, motor vehicle transmission systems, and various other industrial applications employ such hydraulic systems. In hydraulic driving or control, a hydraulic pump pumps hydraulic fluid to a hydraulic motor with an output shaft that drives rotation of an end use element (e.g., wheel axle, gear box, rotating fan, or other suitable usage). The motor output that drives the output shaft is regulated through the control of hydraulic fluid flow through the system by a suitable hydraulic valve system.

One configuration of a hydraulic valve system is a disc valve system or assembly. A disc valve assembly generally incorporates a disc element that rotates in response to hydraulic pressure within the system. Disc valve assemblies are commonly utilized in conjunction with a hydraulic gerotor or geroler motor. In a basic configuration of a hydraulic gerotor or geroler motor, a rotating rotor set rotates relative to an outer element or stator. Depending upon the precise motor type, the rotor set may include lobes that rotate against vanes on an inner surface of the stator (or vice versa the stator may have lobes and the rotor set may have vanes). These lobe and vane surface features on the diameter surfaces of the rotor set relative to the stator create variable displacement windows or motor pockets for the entry and exit of hydraulic fluid that is pumped through the motor via the action of a hydraulic fluid pump. Pressure differentials among the windows or motor pockets cause the rotor set to rotate relative to the stator, and such rotation of the rotor set in turn drives the rotation of the output shaft.

Disc valve assemblies include porting for the control of hydraulic fluid flow into and out from the motor pockets of the hydraulic gerotor or geroler motor. Rotation of the disc element in particular controls fluid flow through porting in a timed manner by the sequential alignment of porting in the disc element with the inlet to and outlet from the motor.

The disc element may include two sets of ports including high pressure side ports and low pressure side ports that are isolated from each other by sealing elements. The high pressure side provides a forward flow through a manifold into the motor pockets, and the low pressure side provides a return flow from the motor pockets back through the manifold and disc valve assembly to complete the hydraulic flow circuit. The rotation of the disc element of the disc valve assembly provides a proper timing of the flow through the manifold to and from specific motor pockets to maintain proper rotation of the motor's rotor set. Generally, therefore, rotational positioning of the disc element of the disc valve assembly causes the porting through the manifold to supply different motor pockets with hydraulic fluid in a progressive manner to the rotor set in such a way as to maintain a pressure differential across the correct motor pockets to maintain further motion of the rotor set. In this manner, the controlled flow resulting by the operation of the disc valve assembly results in hydraulic fluid flow being provided to the different motor pockets with precise timing so as to cause a desired resultant rotation of the rotor set of the motor. The disc element further may include an additional flow pathway that permits leakage of excess fluid to drain from the system.

Although disc valve assemblies provide effective control of a hydraulic fluid flow, they conventionally are expensive and difficult to manufacture. To achieve the requisite hydraulic fluid flow, complex machining processes are used to provide multi-directional porting and flow pathways. As a result, separate or sequential drilling and machining processes are employed for inlet and outlet pathways through the disc element, as well as drilling an additional leakage pathway for the drain of excess hydraulic fluid. Complex sealing elements also have been required in conventional configurations to seal and isolate the separate flow paths from each other. In one typical configuration, a spring loaded metal disc seal in combination with additional secondary sealing elements are employed to provide mechanical seals to separate the different flow pathways. Accordingly, manufacturing costs and complexities have limited the usage of disc valve assemblies for hydraulic fluid flow control.

SUMMARY OF INVENTION

The present invention provides a configuration of a disc valve assembly for the control of hydraulic fluid flow through a hydraulic motor system, which overcomes the deficiencies of conventional configurations. Embodiments of the present invention include a simplified porting and flow pathway configuration as compared to conventional configurations, with enhanced sealing elements that likewise are simple and readily installed and oriented. As a result, the configuration of the present invention provides enhanced flow with reduced flow losses to increase efficiency, and additionally reduces manufacturing cost and complexities, thereby expanding potential usages of disc valve assemblies for hydraulic fluid flow control.

Disc valve assemblies of this type generally may include three distinct pressure zones across the disc valve assembly. In general the three pressure zones may include two working pressure zones that allow for A and B working pressure, and an additional low pressure zone for draining leakage from the motor system. A first working pressure zone A, also referred to herein as Zone 1, may be an inlet flow pathway into the disc valve assembly and out to the hydraulic motor, constituting a high pressure side for a forward flow. A second working pressure zone B, also referred to herein as Zone 2, may be a return flow pathway from the hydraulic motor and then out from the disc valve assembly, or a low pressure side for the return flow. Zones 1 and 2 may be reversed, i.e., reversing the high and low pressure sides, for reverse operation of the motor. The third low pressure zone for draining leakage also is referred to herein as Zone 3.

Conventional or traditional disc valve assemblies of this type have located pressure Zone 1 centered on the inlet side of the disc valve and translate the flow and pressure to the outside of a manifold facing surface. The pressure Zone 2 is located on the outside or outer diameter of the valve assembly and exits on the manifold facing surface. The draining Zone 3 is located mid diameter of the inlet surface and is translated through the valve to the center of the manifold facing surface. Such a configuration thus contains several multi-directional flow pathways, which leads to flow restriction losses and commensurate reduced efficiency of the motor. Such multi-directional flow pathways also must be formed using sequential and complex machining processes. As referenced above, such a configuration of the pressure zones also employs a complex sealing system including a spring loaded metal disc seal in combination with additional secondary sealing elements to provide mechanical seals to separate the different flow pathways. The conventional valve pressure zone locations and flow pathways limit the size of the flow pathways possible, creating an increased pressure drop at high flow which reduces overall motor efficiency.

In contrast, the configuration of the present invention may employ sealing rings on an inlet facing side of the disc valve assembly to create the three distinct zones and fill the clearance gap between the disc element and the valve housing components of the assembly. With such a configuration, the porting and resultant pressure zones of the disc valve assembly of the present invention are reconfigured relative to the conventional configuration described above to optimize the flow pathways through the valve assembly. In particular, in exemplary embodiments of the present invention, the flow pathways through the disc element for Zone 1 may be optimized by locating Zone 1 flow pathways on an outer diameter face of the disc element and oriented fully axially along a longitudinal axis of the disc element to the manifold facing side. Zone 1, therefore, can be formed simply by removing material from the outer diameter face of the disc element, which provides for a far simpler manufacturing process. Such a configuration of Zone 1, being fully axially oriented, also reduces the pressure drop, which further increases motor efficiency.

In addition, in exemplary embodiments of the present invention, Zone 2 flow pathways through the disc element may optimized by locating the Zone 2 flow pathways at a mid diameter location (i.e., between the center axis and the outer diameter of the disc element) and on the inlet facing side extending through the disc element to a manifold facing side. The Zone 3 flow pathway through the disc element may be optimized by locating the Zone 3 flow pathway through the center of the disc element also on the inlet facing side extending axially through the disc element to the manifold facing side. This configuration allows the flow pathways for Zone 2 and Zone 3 also to be fully axial along the longitudinal axis of the disc element, thereby shortening the flow path length and allowing the inlet face opening areas to be increased and optimized for minimizing the pressure drop. The result is increased efficiency of the broader hydraulic motor system insofar as flow losses are reduced. Configuring the pressure zone flow pathways fully axially along the disc element of the valve assembly potentially permits the gravamen of the features of the valve assembly to be molded into the desired form during a single casting process, which substantially reduces the amount of machining required and in turn reduces cost.

In addition, embodiments of the present invention may employ a simplified sealing configuration as compared to the conventional disc valve assembly. Exemplary embodiments of the present invention may employ sealing rings on the inlet facing side of the disc element of the valve assembly to create the three distinct and isolated pressure zones, and to fill the clearance gap between the disc element and the valve housing. The sealing rings may be designed to install into the valve itself and slid on a controlled surface of the valve housing, or installed into the housing and slid on the controlled surface of the valve assembly. As the working pressure energizes the sealing rings, the sealing rings grip the sealed components to prevent rotation of the sealing rings, which creates a resulting force against the valve components to ensure a mechanical seal on the opposing side of the disc element. The seal configuration provides an enhanced sealing function, while reducing the number of component parts of the valve assembly, which further reduces manufacturing cost and complexity by obviating the use of the conventional spring loaded sealing disc. The sealing configuration combines with the optimized porting and flow pathways to form the pressure zones, which as referenced above minimizes the pressure drop which increases the overall efficiency of the hydraulic motor system.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
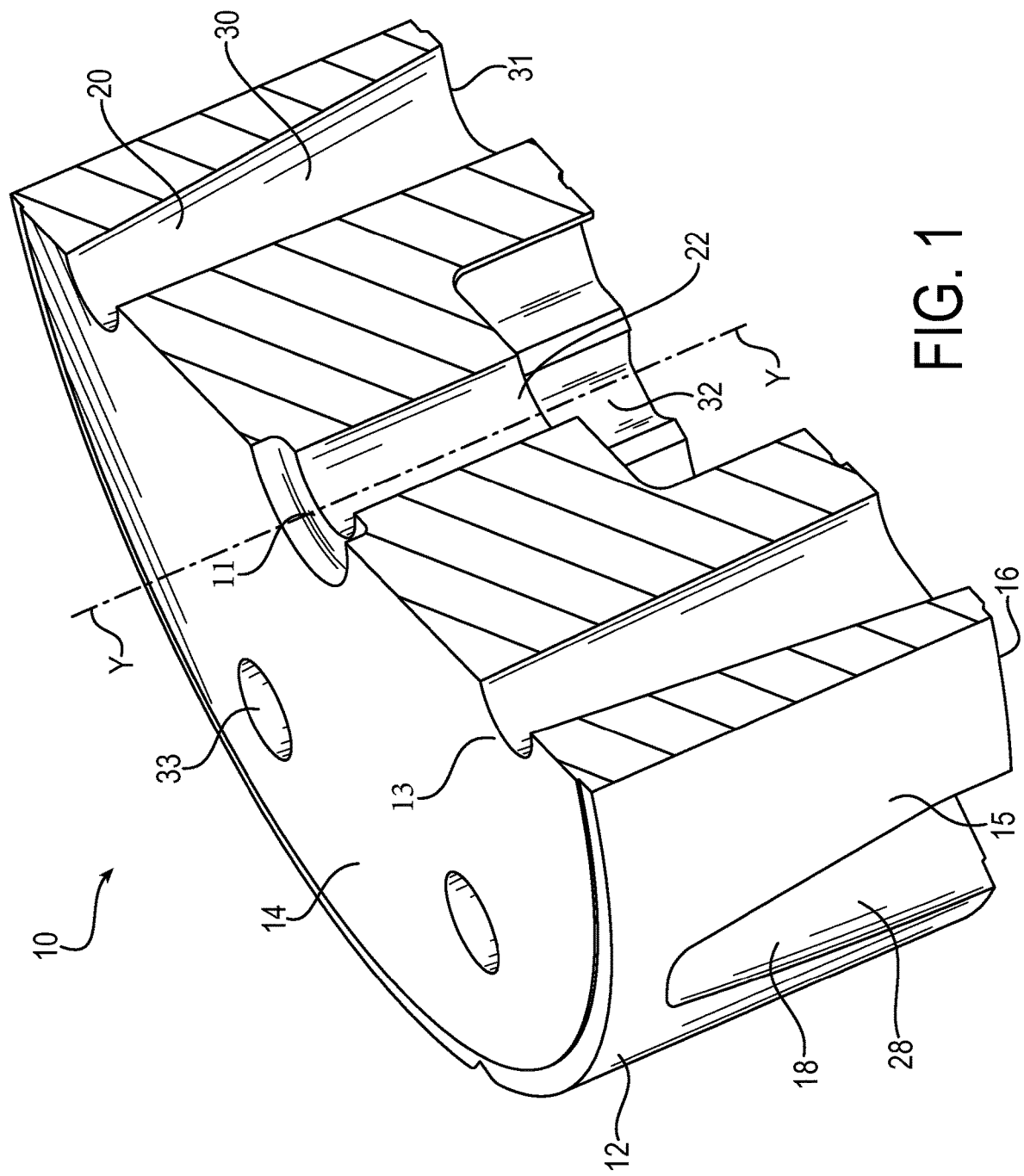
FIG. 1 is a drawing depicting an isometric and cross-sectional view of an exemplary disc element for a disc valve assembly in accordance with embodiments of the present invention.

Embodiments of the present invention will now be described with reference to the drawings, wherein like reference numerals are used to refer to like elements throughout. It will be understood that the figures are not necessarily to scale.

FIG. 1 is a drawing depicting an isometric and cross-sectional view of an exemplary disc element 10 for a disc valve assembly in accordance with embodiments of the present invention. The disc element 10 is depicted in cross-section through a central plane so as to illustrate details of the valve porting and flow pathways through the disc element.

Generally, the disc element may be used in a disc valve assembly configured to control a flow of hydraulic fluid to and from a hydraulic motor in a hydraulic fluid system. In exemplary embodiments, the disc element may include an inlet facing side and a second side opposite to the inlet facing side, and flow pathways through the disc element are configured as a plurality of different pressure zones with the flow pathways extending axially along a longitudinal axis of the disc element from at or adjacent to the inlet facing side to the second side. The plurality of different pressure zones may include three pressure zones: a Zone 1 pressure zone, a Zone 2 pressure zone, and a Zone 3 pressure zone, wherein flow pathways of Zone 1, Zone 2, and Zone 3 are fluidly isolated from each other. By configuring the flow pathways of the pressure zones fully axially along the longitudinal axis through the disc element, flows pathways are shortened and flow restrictions are reduced, which limits flow losses to improve overall efficiency of the system.

Referring to FIG. 1, the disc element 10 may be a metal disc or formed of a comparable suitable rigid plastic or like material, as are known in the art for use in disc valves. The disc element 10 includes a valve body 12 that may have a generally cylindrical shape extending in an axial direction along a longitudinal axis "Y". The valve body 12 has a first or inlet facing side 14, and a second side 16 that is opposite to the first or inlet facing side 14. When incorporated into a hydraulic motor system (which is further detailed below), the second side typically faces the manifold of the system, and therefore the second side 16 also may be referred to herein as the manifold facing side. The valve body 12 of the disc element 10 further has an outer diameter face 15 that extends between the inlet facing side 14 and the second/manifold facing side 16.

The valve body 12 of the disc element 10 may define valve porting constituting three distinct pressure zones across the disc valve assembly. In general, the three pressure zones may include two working pressure zones that allow for A and B working pressure, and an additional low pressure zone for draining a leakage flow out from the hydraulic motor system. Referring to FIG. 1, the three pressure zones may include: a first working pressure zone 18 for working pressure A, also referred to herein as Zone 1; a second working pressure zone 20 for a working pressure B, also referred to herein as Zone 2; and a third low pressure zone 22 for draining leakage, also referred to herein as Zone 3. Zone 1 may be a high pressure side for a forward flow of hydraulic fluid including an inlet pathway from a hydraulic fluid source into and through the disc element 10, and out through the second side of the disc element ultimately to a downstream hydraulic motor. Zone 2 may be a low pressure side relative to the high pressure side for a return flow pathway of hydraulic fluid from the hydraulic motor into the second side and through the disc element, and then out through the inlet facing side to the hydraulic fluid source to complete a hydraulic circuit. It will be appreciated that the directional flows of Zone 1 and Zone 2 may be reversed, i.e., reversing the high pressure and low pressure sides, so as to provide for reverse operation of the hydraulic motor. Zone 3 may provide an additional low pressure drain pathway that permits the draining of a leakage flow of hydraulic fluid. In general, leakage from the motor system, which may be either inherent or intentional from a lubrication function for example, combines from passages throughout the motor system to be expelled via the disc element through the Zone 3 pathway to a low pressure tank or comparable outlet flow.

The present invention provides for optimization of the Zone 1, Zone 2, and Zone 3 flow pathways through the disc element. Generally, each of the flow pathways for the three zones is oriented in a fully axial direction along the longitudinal axis Y, running from at or adjacent to the inlet facing side 14 to the second/manifold facing side 16. Referring to the example in FIG. 1, Zone 1 (reference numeral 18) may be optimized by configuring Zone 1 as a plurality of Zone 1 flow pathways 28 through the disc element located on the outer diameter face 15. In this manner, the Zone 1 flow pathways 28 may be oriented to extend fully axially along the longitudinal axis of the disc element from adjacent to the inlet facing side 14 to the second/manifold facing side 16. In the exemplary embodiment of FIG. 1, the Zone 1 flow pathways 28 thus do not extend through the entirety of the disc element 10 in the axial direction. The Zone 1 flow pathways, therefore, can be formed simply by removing material from the outer diameter face 15 of the disc element, which provides for a far simpler manufacturing process as compared to drilling and machining the multi-directional flow pathways of the conventional configuration. The configuration of Zone 1 in FIG. 1 also reduces the pressure drop, which further increases motor efficiency.

Similarly, in the example of FIG. 1, Zone 2 (reference numeral 20) may be optimized by configuring Zone 2 as a plurality of Zone 2 flow pathways 30 through the disc element located at a mid diameter location 13 (i.e., between a center 11 of the disc element and the outer diameter face of the disc element). The Zone 2 flow pathways 30 may extend fully axially along the longitudinal axis of the disc element from the inlet facing side 14 to the second/manifold facing side 16, and may extend through the entirety of the disc element in the axial direction. Zone 3 (reference numeral 22) may be optimized by configuring Zone 3 as a Zone 3 flow pathway 32 through the disc element located through the center 11 of the disc element 10. The Zone 3 flow pathway may extend fully axially along the longitudinal axis of the disc element from the inlet facing side 14 to the second/manifold facing side 16, and may extend through the entirety of the disc element in the axial direction. In this manner, the Zone 2 flow pathways 30 and the Zone 3 flow pathway 32 likewise are oriented fully axially along the longitudinal axis Y of the disc element from the inlet facing side 14 to the manifold facing side 16. In the exemplary embodiment of FIG. 1, therefore, the Zone 2 and Zone 3 flow pathways extend through the entirety of the disc element 10.

The difference in the degree of extension of the Zone 1 flow pathways as compared to the Zone 2 flow pathways in particular aids in isolating the Zone 1 flow from the Zone 2 flow, so as to isolate the high pressure side forward flow from the low pressure side return flow. In addition, with the Zone 2 flow pathways 30 being fully axial along the longitudinal axis of the disc element, this shortens the flow path length and allows the opening areas 31 of the flow pathways on the manifold facing side 16 to be increased relative to the opening areas 33 on the inlet facing side 14, which optimizes the flow pathways for minimizing the pressure drop. In other words, the Zone 2 pathways may flare outward as they extend from the inlet facing side 14 to the manifold facing side 16. The Zone 1 flow pathways, as also seen in FIG. 1, similarly may flare outward as they extend from adjacent to the inlet facing side 14 to the manifold facing side 16. The result is increased efficiency of the broader hydraulic motor system insofar as flow losses are reduced. Furthermore, configuring the pressure zone flow pathways fully axially along the disc element potentially permits the gravamen of the features of the valve assembly to be molded into the desired form during a single casting process, which substantially reduces the amount of machining required and in turn reduces cost.

As further detailed below, two sealing elements (see FIG. 2) may be provided on the inlet facing side of the disc element for isolating the different pressure zones from each other. The sealing elements respectively may be annular sealing rings. A first sealing ring may be located on the inlet face side 14 of the disc element and at a radial position between the outer diameter face 15 and the mid diameter location of the Zone 2 flow pathways. A second sealing ring also may be located on the inlet face side 14 of the disc element, and at a radial position around the Zone 3 fluid pathway and radially inward relative to the mid diameter location of the Zone 2 flow pathways and the first sealing rings.

Figure 2:
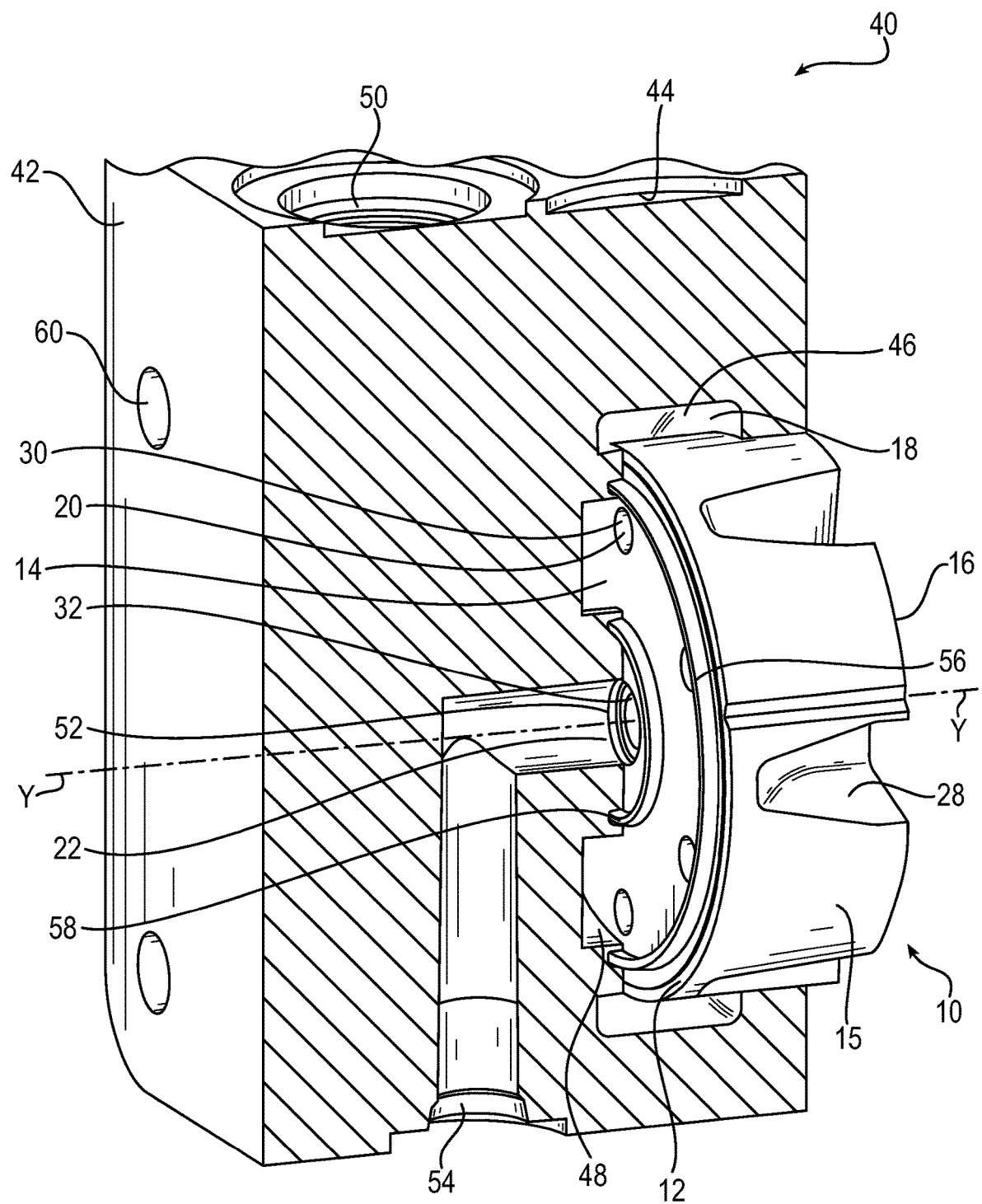
FIG. 2 is a drawing depicting an isometric and partial cross-sectional view of an exemplary disc valve assembly including the disc element of FIG. 1 in accordance with embodiments of the present invention.

FIG. 2 is a drawing depicting an isometric and partial cross-sectional view of an exemplary disc valve assembly 40 including the disc element 10 of FIG. 1 and a valve housing 42 in accordance with embodiments of the present invention. In particular, substantially the entire disc element 10 is shown located within the valve housing 42, with the valve housing 42 being shown in cross section so as to illustrate the fluid flow pathways and connections as between the housing 42 and the disc element 10.

Generally, the disc valve assembly is configured to control a flow of hydraulic fluid to and from a hydraulic motor in a hydraulic fluid system. In exemplary embodiments, the disc valve assembly may include, as described above, a disc element comprising an inlet facing side and a second side opposite to the inlet facing side, and flow pathways configured as a plurality of different pressure zones with the flow pathways extending axially along a longitudinal axis of the disc element from at or adjacent to the inlet facing side to the second side, and a valve housing that houses the disc element, the valve housing comprising porting configured as part of the plurality of different pressure zones respectively in fluid communication with the flow pathways of the disc element. The disc element is configured to rotate to control a flow of hydraulic fluid through the disc valve assembly. Again, by configuring the flow pathways of the pressure zones fully axially along the longitudinal axis through the disc element, flows pathways are shortened and flow restrictions are reduced, which limits flow losses to improve overall efficiency of the system.

With reference to the valve housing 42, Zone 1 further may include a first port 44 constituting an external port of the valve housing, and a second port 46 providing fluid communication between the valve housing and the Zone 1 flow pathways 28 of the disc element. During operation of the disc element, the second port 46 is aligned with the plurality of Zone 1 flow pathways 28 to control the flow of hydraulic fluid through the disc valve assembly. As referenced above, the Zone 1 (18) flow pathways 28 may provide an inlet flow pathway for a forward flow of hydraulic fluid on a high pressure side from a hydraulic fluid source (not shown) into the disc element 10 and out to a downstream hydraulic motor (also not shown).

In an example where Zone 1 is the high pressure side, Zone 1, therefore, further may include the first port 44 constituting an external port inlet to the housing for a forward fluid flow from a hydraulic fluid source through the housing, and the second port 46 constituting an outlet from the housing into the Zone 1 flow pathways 28 in the disc element. During operation, the second port 46 is aligned with the Zone 1 flow pathways 28 at the end adjacent to the inlet facing side 14 of the disc element. Again, in this example the Zone 1 flow pathways 28 are located in the outer diameter face 15 of the disc element, and do not extend all the way through the entirety of the disc element to the inlet facing side 14. Fluid in turn flows through the flow pathways 28 exiting the disc element 10 on the manifold facing side 16, flowing ultimately to the downstream hydraulic motor.

Again with reference to the valve housing 42, Zone 2 further may include a third port 48 providing fluid communication between the Zone 2 flow pathways of the disc element and the valve housing, and a fourth port 50 constituting another external port of the valve housing. During operation of the disc element, the third port 48 is aligned with the plurality of Zone 2 flow pathways 30 to control the flow of hydraulic fluid through the disc valve assembly. As referenced above, the Zone 2 (20) flow pathways 30 may provide a return flow pathway on a low pressure side from the hydraulic motor and then out from the disc element 10 to the hydraulic fluid source to complete the hydraulic circuit.

In an example where Zone 2 is the low pressure side for the return flow, fluid flows from the manifold facing side 16 of the disc element and through the Zone 2 flow pathways 30. Zone 2, therefore, further may include the third port 48 constituting an inlet to the housing 42 from the Zone 2 flow pathways 30 for a return fluid flow from the disc element 10 through the housing 42, and the fourth port 50 constituting an external port outlet from the housing 42 back to hydraulic fluid source to compete the hydraulic circuit. During operation, the third port 48 is aligned with the Zone 2 flow pathways 30 at the end opening on the inlet facing side 14 of the disc element. Again, in this example the Zone 2 flow pathways 30 are located mid diameter and extend along the longitudinal axis Y of the disc element, and extend all the way through the entirety of the disc element 10 between the inlet facing side 14 and the manifold facing side 16. The relative locations and extent of the Zone 1 flow pathways 28 as compared to the Zone 2 flow pathways 30 isolate the flow on the high pressure side from the low pressure side. It will further be appreciated that as referenced above, the directional flows of Zone 1 and Zone 2 may be reversed, i.e., reversing the high pressure and low pressure sides, so as to provide for reverse operation of the hydraulic motor. In such case, the directional flows through the various flow pathways and ports are reversed as compared to the above description.

Again with reference to the valve housing 42, Zone 3 further may include a fifth port 52 providing fluid communication between the Zone 3 flow pathway of the disc element and the valve housing, and a sixth port 54 constituting another external port of the valve housing for draining a leakage flow. More particularly, as referenced above the Zone 3 (22) flow pathway 32 may provide a low pressure drain pathway for draining leakage from combined passages throughout the motor system, which is then expelled via the disc element through the Zone 3 pathway to a low pressure tank or fluid reservoir (not shown). In an example where Zone 3 is a low pressure drain flow, leakage fluid flows from the manifold facing side 16 of the disc element and through the Zone 3 flow pathway 32. Zone 3, therefore, further may include the fifth port 52 constituting an inlet to the housing 42 from the Zone 3 flow pathway 32 for a draining fluid flow from the disc element 10 through the housing 42, and the sixth port 54 constituting a drain port from the housing 42 to a low pressure tank or reservoir. The fifth port 52 is aligned with the fluid pathway 32 at the end opening on the inlet facing side 14 of the disc element. Again, in this example the Zone 3 flow pathway 32 is located in the center of the disc element and extends along the longitudinal axis Y of the disc element, and extends all the way through the entirety of the disc element 10 between the inlet facing side 14 and the manifold facing side 16.

The disc valve assembly further may include a plurality of sealing elements for sealing the disc element relative to the housing so as to isolate the flow pathways of the three zones. In the example of FIG. 2, the plurality sealing elements may be configured as a plurality of annular sealing rings that may include a first annular sealing ring 56 and a second annular sealing ring 58. The sealing rings may be located on the inlet facing side 14 of the disc element to create the three distinct and isolated pressure zones described above, and to fill the clearance gap between the disc element 10 and the valve housing 42.

The sealing rings 56 and 58 may be made of any suitable elastomeric material as are known in the art for providing energized seals in hydraulic applications. The sealing rings may be designed to be installed into the valve assembly itself and slid on a controlled surface of the valve housing to be installed, or installed into the housing and slid on the controlled surface likewise to be properly located. As the working pressure energizes the sealing rings, the sealing rings grip sealed components to prevent rotation of the sealing rings, which creates a resulting force against the valve components to ensure a mechanical seal on the opposing side of the disc element. The seal configuration provides an enhanced sealing function, while reducing the number of component parts of the valve assembly, which further reduces manufacturing cost and complexity by obviating the use of the conventional spring loaded sealing disc.

As referenced above, the first sealing ring 56 may be located on the inlet facing side 14 of the disc element 10 and may extend annularly at a radial position between the outer diameter face 15 and the mid diameter location of the Zone 2 flow pathways 30. First sealing ring 56 thus operates to provide a seal isolating the Zone 1 flow from the Zone 2 flow. Second sealing ring 58 also may be located on the inlet facing side 14 of the disc element, and may extend annularly at a radial position between the Zone 3 fluid pathway 32 radially inward relative to the mid diameter location of the Zone 2 flow pathways 30. Second sealing ring 58 thus operates to provide a seal isolating the Zone 2 flow from the Zone 3 flow. The sealing configuration thus combines with the optimized porting and flow pathways to form the pressure zones, which as referenced above minimizes the pressure drop which increases the overall efficiency of the hydraulic motor system.

The additional holes 60 shown in the housing 42 may be mounting holes. The mounting holes 60 are configured to receive suitable fastening elements for mounting the disc valve assembly to other components of the hydraulic motor system.

Figure 3:
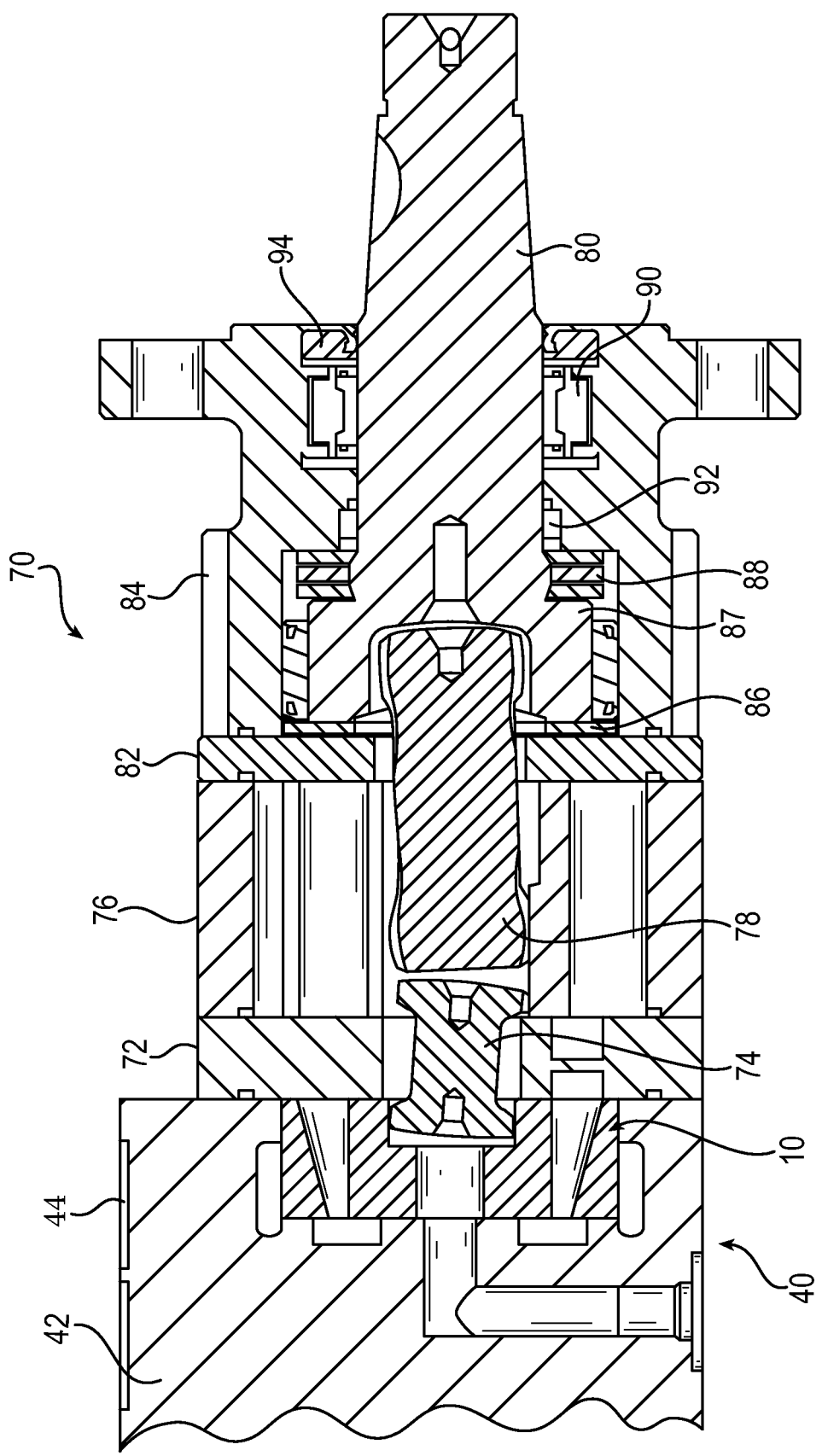
FIG. 3 is a drawing depicting a cross-sectional view of an exemplary hydraulic motor system including the disc valve assembly of FIG. 2 in accordance with embodiments of the present invention.

FIG. 3 is a drawing depicting a cross-sectional view of an exemplary hydraulic motor system 70, including the disc valve assembly 40 of FIG. 2 with the disc element 10, in accordance with embodiments of the present invention. In general, the hydraulic motor system 70 may include the disc valve assembly of any of the described embodiments, a manifold against which the disc valve assembly is mounted with the second/manifold facing side of the disc element being mounted against the manifold, and a motor. The manifold includes porting for communicating fluid between the disc valve assembly and the motor, and the disc valve assembly operates to control the flow of hydraulic fluid through the hydraulic motor system.

Referring to FIG. 3, the disc valve assembly 40 may be mounted onto a manifold 72 via the valve housing 42 with the manifold facing side of the disc element 10 being mounted against the manifold. Because of its positioning within the overall system 70, the housing 42 of the disc valve assembly commonly is referred to as a rear housing. A valve drive link 74 drives rotation of the disc element 10 so as to align the valve porting with the porting in the manifold 72 for the forward and return flow of hydraulic fluid as described above. The manifold 72 may be mounted to the hydraulic motor 76. The manifold 72 has porting for fluid communication of the forward flow into the motor 76, and the return flow from the motor 76 to provide a flow to and from the motor pockets of the motor.

The hydraulic motor 76 may be configured as a hydraulic gerotor or geroler motor. In a basic configuration of a hydraulic gerotor or geroler motor, a rotating rotor set rotates relative to an outer element or stator. Depending upon the precise motor type or configuration, the rotor set may include lobes that rotate against vanes on an inner surface of the stator (or vice versa the stator may have lobes and the rotor set may have vanes). These lobe and vane surface features on the diameter surfaces of the rotor set relative to the stator create variable displacement windows or motor pockets for the entry and exit of hydraulic fluid that is pumped through the motor via the action of a hydraulic fluid pump. Pressure differentials among the windows or motor pockets cause the rotor set to rotate relative to the stator, and such rotation of the rotor set in turn drives the rotation of the output shaft.

The disc valve assembly 40 controls the described forward flow and return flow to control the flow of hydraulic fluid into and out from the motor pockets of the hydraulic motor 76. Rotation of the disc element 10 in particular controls fluid flow through porting in a timed manner by the sequential alignment of porting in the disc element with the manifold porting and ultimately the motor. The high pressure side flow pathways provide a forward flow through the manifold and into the motor pockets, and the low pressure side flow pathways provide a return flow from the motor pockets back through the manifold and disc valve assembly to complete the hydraulic flow circuit. The rotation of the disc element of the disc valve assembly is controlled by the valve drive link 74 to provide a proper timing of the flow through the manifold 72 to and from specific motor pockets of the motor 76 to maintain proper rotation of the motor's rotor set. Generally, therefore, rotational positioning of the disc element 10 of the disc valve assembly 40 causes the porting through the manifold to supply different motor pockets with hydraulic fluid in a progressive manner to the rotor set in such a way as to maintain a pressure differential across the correct motor pockets to maintain further motion of the rotor set.

Rotation of the rotor set of the motor 76 may drive a main drive link 78 that may be coupled to an output shaft 80 that are driven by the motor. The output shaft 80 in turn may drive rotation of any suitable end use element (e.g., wheel axle, gear box, rotating fan, or other suitable usage), or the output shaft may be a coupling shaft that provides an additional linkage to another driving shaft. The motor 76 may be mounted oppositely from the manifold 72 to a wear plate 82, that in turn is mounted to a forward housing 84 that has components for housing and supporting portions of the main drive link 78 and output shaft 80. The system may include one or more thrust washers 86 and bearing sets 87, 88 and 90 for supporting the drive link and output shaft. A shaft seal 92 may provide a seal as between the output shaft 80 and an inner surface of the forward housing 84, and a weather seal 94 may provide a seal against external contaminants where the output shaft 80 exits the forward housing 84.

As aspect of the invention is a disc valve assembly configured to control a flow of hydraulic fluid to and from a hydraulic motor in a hydraulic fluid system. In exemplary embodiments, the disc valve assembly may include a disc element comprising an inlet facing side and a second side opposite to the inlet facing side, and flow pathways configured as a plurality of different pressure zones with the flow pathways extending axially along a longitudinal axis of the disc element from at or adjacent to the inlet facing side to the second side; and a valve housing that houses the disc element, the valve housing comprising porting configured as part of the plurality of different pressure zones respectively in fluid communication with the flow pathways of the disc element. The disc element is configured to rotate to control a flow of hydraulic fluid through the disc valve assembly. The disc valve assembly may include one or more of the following features, either individually or in combination.

In an exemplary embodiment of the disc valve assembly, the plurality of different pressure zones comprises a Zone 1 pressure zone, a Zone 2 pressure zone, and a Zone 3 pressure zone, wherein flow pathways of Zone 1, Zone 2, and Zone 3 are fluidly isolated from each other.

In an exemplary embodiment of the disc valve assembly, Zone 1 comprises a plurality of Zone 1 flow pathways through the disc element, the Zone 1 flow pathways being located on an outer diameter face of the disc element.

In an exemplary embodiment of the disc valve assembly, the Zone 1 flow pathways extend axially along the longitudinal axis of the disc element from adjacent to the inlet facing side to the second side, and do not extend through the entirety of the disc element in the axial direction.

In an exemplary embodiment of the disc valve assembly, Zone 1 further comprises a first port constituting an external port of the valve housing, and a second port providing fluid communication between the valve housing and the Zone 1 flow pathways of the disc element, and wherein during operation of the disc element the second port is aligned with the plurality of Zone 1 flow pathways to control the flow of hydraulic fluid through the disc valve assembly.

In an exemplary embodiment of the disc valve assembly, Zone 2 comprises a plurality of Zone 2 flow pathways through the disc element, the Zone 2 flow pathways being located at a mid diameter location between a center and the outer diameter face of the disc element.

In an exemplary embodiment of the disc valve assembly, the Zone 2 flow pathways extend axially along the longitudinal axis of the disc element from the inlet facing side to the second side, and extend through the entirety of the disc element in the axial direction.

In an exemplary embodiment of the disc valve assembly, Zone 2 further comprises a third port providing fluid communication between the Zone 2 flow pathways of the disc element and the valve housing, and a fourth port constituting another external port of the valve housing, wherein during operation of the disc element the third port is aligned with the plurality of Zone 2 flow pathways to control the flow of hydraulic fluid through the disc valve assembly.

In an exemplary embodiment of the disc valve assembly, Zone 3 comprises a Zone 3 flow pathway through the disc element, the Zone 3 flow pathway being located at a center of the disc element.

In an exemplary embodiment of the disc valve assembly, the Zone 3 flow pathway extends axially along the longitudinal axis of the disc element from the inlet facing side to the second side, and extends through the entirety of the disc element in the axial direction.

In an exemplary embodiment of the disc valve assembly, Zone 3 further comprises a fifth port providing fluid communication between the Zone 3 flow pathway of the disc element and the valve housing, and a sixth port constituting another external port of the valve housing.

In an exemplary embodiment of the disc valve assembly, Zone 1 comprises a high pressure side for a forward flow of hydraulic fluid from the valve housing through the disc element; Zone 2 comprises a low pressure side relative to the high pressure side for a return flow of hydraulic fluid through the disc element back through the valve housing; and Zone 3 comprises a drain pathway for draining a leakage flow from the motor system through the disc valve assembly.

In an exemplary embodiment of the disc valve assembly, the assembly further includes a plurality of annular sealing rings that are configured to isolate the different pressure zones from each other.

In an exemplary embodiment of the disc valve assembly, each of the plurality of annular sealing rings is located on the inlet facing side of the disc element.

In an exemplary embodiment of the disc valve assembly, the assembly further includes a plurality of annular sealing rings that are configured to isolate the different pressure zones from each other.

In an exemplary embodiment of the disc valve assembly, Zone 1 comprises a plurality of Zone 1 flow pathways through the disc element, the Zone 1 flow pathways being located on an outer diameter face of the disc element; Zone 2 comprises a plurality of Zone 2 flow pathways through the disc element, the Zone 2 flow pathways being located at a mid diameter location between a center and the outer diameter face of the disc element; and the plurality of annular sealing rings includes a first sealing ring located on the inlet facing side of the disc element and extending annularly at a radial position between the outer diameter face and the mid diameter location of the Zone 2 flow pathways, thereby isolating the Zone 1 flow from the Zone 2 flow.

In an exemplary embodiment of the disc valve assembly, Zone 3 comprises a Zone 3 flow pathway through the disc element, the Zone 3 flow pathway extending through the center of the disc element; and the plurality of annular sealing rings includes a second sealing ring located on the inlet facing side of the disc element and extending annularly at a radial position between the Zone 3 fluid pathway radially inward relative to the mid diameter location of the Zone 2 flow pathways, thereby isolating the Zone 2 flow from the Zone 3 flow.

Another aspect of the invention is a hydraulic motor system. In exemplary embodiments, the hydraulic motor system may include the disc valve assembly of any of the embodiments, a manifold, wherein the second side of the disc element is a manifold facing side and the disc valve assembly is mounted to the manifold with the manifold facing side of the disc element being mounted against the manifold, and a motor. The manifold includes porting for communicating fluid between the disc valve assembly and the motor, and the disc valve assembly operates to control the flow of hydraulic fluid through the hydraulic motor system. The hydraulic motor system may include one or more of the following features, either individually or in combination.

In an exemplary embodiment of the hydraulic motor system, the motor is a hydraulic gerotor or geroler motor.

In an exemplary embodiment of the hydraulic motor system, the system further includes a valve drive link for driving rotation of the disc element to control the flow of hydraulic fluid through the hydraulic motor system.

In an exemplary embodiment of the hydraulic motor system, the system further includes a main drive link and an output shaft that are driven by the motor.

Another aspect of the invention is a disc element for use in a disc valve assembly configured to control a flow of hydraulic fluid to and from a hydraulic motor in a hydraulic fluid system. In exemplary embodiments, the disc element may include an inlet facing side and a second side opposite to the inlet facing side, and flow pathways configured as a plurality of different pressure zones with the flow pathways extending axially along a longitudinal axis of the disc element from at or adjacent to the inlet facing side to the second side. The disc element may include one or more of the following features, either individually or in combination.

In an exemplary embodiment of the disc element, the plurality of different pressure zones comprises a Zone 1 pressure zone, a Zone 2 pressure zone, and a Zone 3 pressure zone, wherein flow pathways of Zone 1, Zone 2, and Zone 3 are fluidly isolated from each other.

In an exemplary embodiment of the disc element, Zone 1 comprises a plurality of Zone 1 flow pathways through the disc element, the Zone 1 flow pathways being located on an outer diameter face of the disc element.

In an exemplary embodiment of the disc element, the Zone 1 flow pathways extend axially along the longitudinal axis of the disc element from adjacent to the inlet facing side to the second side, and do not extend through the entirety of the disc element in the axial direction.

In an exemplary embodiment of the disc element, Zone 2 comprises a plurality of Zone 2 flow pathways through the disc element, the Zone 2 flow pathways being located at a mid diameter location between a center and the outer diameter face of the disc element.

In an exemplary embodiment of the disc element, the Zone 2 flow pathways extend axially along the longitudinal axis of the disc element from the inlet facing side to the second side, and extend through the entirety of the disc element in the axial direction.

In an exemplary embodiment of the disc element, Zone 3 comprises a Zone 3 flow pathway through the disc element, the Zone 3 flow pathway being located at a center of the disc element.

In an exemplary embodiment of the disc element, the Zone 3 flow pathway extends axially along the longitudinal axis of the disc element from the inlet facing side to the second side, and extends through the entirety of the disc element in the axial direction.

In an exemplary embodiment of the disc element, Zone 1 comprises a high pressure side for a forward flow of hydraulic fluid through the disc element out through the second side; Zone 2 comprises a low pressure side relative to the high pressure side for a return flow of hydraulic fluid through the disc element from the second side and out through the inlet facing side; and Zone 3 comprises a drain pathway for draining a leakage flow from the motor system through the disc element.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:
1. A disc valve assembly configured to control a flow of hydraulic fluid to and from a hydraulic motor in a hydraulic fluid system, the disc valve assembly comprising:
   a disc element comprising an inlet facing side and a second side opposite to the inlet facing side, and flow pathways configured as a plurality of different pressure zones with the flow pathways extending axially along a longitudinal axis of the disc element from at or adjacent to the inlet facing side to the second side; and
   a valve housing that houses the disc element, the valve housing comprising porting configured as part of the plurality of different pressure zones respectively in fluid communication with the flow pathways of the disc element;
   wherein the disc element is configured to rotate to control a flow of hydraulic fluid through the disc valve assembly; and
   wherein the plurality of different pressure zones comprises a Zone 1 pressure zone, a Zone 2 pressure zone, and a Zone 3 pressure zone, wherein flow pathways of the Zone 1 pressure zone, the Zone 2 pressure zone, and the Zone 3 pressure zone are fluidly isolated from each other;
   the disc valve assembly further comprising a plurality of annular sealing rings that are configured to isolate the plurality of different pressure zones from each other;
   wherein:
   the Zone 1 pressure zone comprises a plurality of Zone 1 flow pathways through the disc element, the Zone 1 flow pathways being located on an outer diameter face of the disc element;
   the Zone 2 pressure zone comprises a plurality of Zone 2 flow pathways through the disc element, the Zone 2 flow pathways being located at a mid diameter location between a center and the outer diameter face of the disc element; and
   the plurality of annular sealing rings includes a first sealing ring located on the inlet facing side of the disc element and extending annularly at a radial position between the outer diameter face and the mid diameter location of the Zone 2 flow pathways, thereby isolating the flow in the Zone 1 pressure zone from the flow in the Zone 2 pressure zone.

2. The disc valve assembly of claim 1, wherein the Zone 1 flow pathways extend axially along the longitudinal axis of the disc element from adjacent to the inlet facing side to the second side, and do not extend through the entirety of the disc element in the axial direction.

3. The disc valve assembly of claim 2, wherein the Zone 1 pressure zone further comprises a first port constituting an external port of the valve housing, and a second port providing fluid communication between the valve housing and the Zone 1 flow pathways of the disc element, and wherein during operation of the disc element the second port is aligned with the plurality of Zone 1 flow pathways to control the flow of hydraulic fluid through the disc valve assembly.

4. The disc valve assembly of claim 1, wherein the Zone 2 flow pathways extend axially along the longitudinal axis of the disc element from the inlet facing side to the second side, and extend through the entirety of the disc element in the axial direction.

5. The disc valve assembly of claim 4, wherein the Zone 2 pressure zone further comprises a third port providing fluid communication between the Zone 2 flow pathways of the disc element and the valve housing, and a fourth port constituting another external port of the valve housing, wherein during operation of the disc element the third port is aligned with the plurality of Zone 2 flow pathways to control the flow of hydraulic fluid through the disc valve assembly.

6. The disc valve assembly of claim 1, wherein the Zone 3 pressure zone comprises a Zone 3 flow pathway through the disc element, the Zone 3 flow pathway being located at the center of the disc element.

7. The disc valve assembly of claim 6, wherein the Zone 3 flow pathway extends axially along the longitudinal axis of the disc element from the inlet facing side to the second side, and extends through the entirety of the disc element in the axial direction.

8. The disc valve assembly of claim 7, wherein the Zone 3 pressure zone further comprises a fifth port providing fluid communication between the Zone 3 flow pathway of the disc element and the valve housing, and a sixth port constituting another external port of the valve housing.

9. The disc valve assembly of claim 1, wherein:
the Zone 1 pressure zone comprises a high pressure side for a forward flow of hydraulic fluid from the valve housing through the disc element;
the Zone 2 pressure zone comprises a low pressure side relative to the high pressure side for a return flow of hydraulic fluid through the disc element back through the valve housing; and
the Zone 3 pressure zone comprises a drain pathway for draining a leakage flow from the hydraulic motor through the disc valve assembly.

10. The disc valve assembly of claim 1, wherein each of the plurality of annular sealing rings is located on the inlet facing side of the disc element.

11. The disc valve assembly of claim 1, wherein:
the Zone 3 pressure zone comprises a Zone 3 flow pathway through the disc element, the Zone 3 flow pathway extending through the center of the disc element; and
the plurality of annular sealing rings includes a second sealing ring located on the inlet facing side of the disc element and extending annularly at a radial position between the Zone 3 fluid pathway radially inward relative to the mid diameter location of the Zone 2 flow pathways, thereby isolating the flow in the Zone 2 pressure zone from the flow in the Zone 3 pressure zone.

12. A hydraulic motor system comprising:
the disc valve assembly of claim 1;
a manifold, wherein the second side of the disc element is a manifold facing side and the disc valve assembly is mounted to the manifold with the manifold facing side of the disc element being mounted against the manifold; and
a hydraulic motor;
wherein the manifold includes porting for communicating fluid between the disc valve assembly and the hydraulic motor, and the disc valve assembly operates to control the flow of hydraulic fluid through the hydraulic motor system.

13. The hydraulic motor system of claim 12, wherein the hydraulic motor is a hydraulic gerotor or geroler motor.

14. The hydraulic motor system of claim 12, further comprising a valve drive link for driving rotation of the disc element to control the flow of hydraulic fluid through the hydraulic motor system.

15. The hydraulic motor system of claim 12, further comprising a main drive link and an output shaft that are driven by the hydraulic motor.

\* \* \* \* \*